United States Patent
Keller et al.

(10) Patent No.: US 8,662,592 B2
(45) Date of Patent: Mar. 4, 2014

(54) MOTOR-VEHICLE HEADREST

(75) Inventors: Hubert Keller, Amberg (DE); Manuel Boesel, Freudenberg (DE); Manfred Schlierf, Amberg (DE); Eberhard Luber, Illschwang (DE)

(73) Assignee: Grammer AG, Amberg (DE)

( * ) Notice: Subject to any disclaimer, the term of this patent is extended or adjusted under 35 U.S.C. 154(b) by 324 days.

(21) Appl. No.: 13/025,188

(22) Filed: Feb. 11, 2011

(65) Prior Publication Data

US 2011/0198908 A1 Aug. 18, 2011

(30) Foreign Application Priority Data

Feb. 12, 2010 (DE) .................. 10 2010 007 942

(51) Int. Cl.
*A47C 7/36* (2006.01)
(52) U.S. Cl.
USPC ......................................... 297/409; 297/408
(58) Field of Classification Search
USPC ................................................. 297/406–409
See application file for complete search history.

(56) References Cited

U.S. PATENT DOCUMENTS

| | | | |
|---|---|---|---|
| 5,020,855 A * | 6/1991 | Lindberg et al. ............... | 297/391 |
| 6,688,697 B2 * | 2/2004 | Baumann et al. ............. | 297/391 |
| 7,070,235 B2 * | 7/2006 | Schilling et al. .......... | 297/216.12 |
| 7,455,363 B2 * | 11/2008 | Chung, II ...................... | 297/407 |
| 7,520,564 B2 * | 4/2009 | Woerner .................. | 297/216.12 |
| 7,631,932 B2 * | 12/2009 | Hoffmann ................ | 297/216.12 |
| 2004/0195894 A1 * | 10/2004 | Pal et al. ....................... | 297/406 |
| 2004/0262974 A1 * | 12/2004 | Terada et al. ................. | 297/407 |
| 2007/0075578 A1 * | 4/2007 | Klukowski .................... | 297/391 |
| 2011/0175421 A1 * | 7/2011 | Grable ........................... | 297/408 |

FOREIGN PATENT DOCUMENTS

| | | |
|---|---|---|
| DE | 19951966 A | 5/2001 |
| DE | 10202598 B | 8/2003 |
| DE | 20321462 U | 7/2007 |

* cited by examiner

*Primary Examiner* — David R Dunn
*Assistant Examiner* — Alexander Harrison
(74) *Attorney, Agent, or Firm* — Andrew Wilford

(57) ABSTRACT

A motor-vehicle headrest has a base fixable to a motor vehicle seat and a cushion support having a forwardly directed front face adapted to engage a head of a person in the seat. An upper link has a front end pivoted at an upper support axis on the support and a rear end pivoted at an upper base axis on the base, and a lower link having a front end pivoted at a lower support axis on the support offset downward from the upper support axis and a rear end pivoted at a lower base axis on the base offset downward from the upper base axis. The cushion is shiftable relative to the base between a rear position and a front position on pivoting of the links about the respective axes. A rigid brace is pivoted on the upper link between the upper axes and on the lower link between the lower axes.

10 Claims, 12 Drawing Sheets

MOTOR-VEHICLE HEADREST

FIELD OF THE INVENTION

The present invention relates to a headrest. More particularly this invention concerns a headrest for a motor-vehicle seat.

BACKGROUND OF THE INVENTION

Such a headrest is described in DE 199 51 966. In the headrest, a cushion body with at least two pivoted levers that are spaced from each other can be displaced between a rear starting position and a working position and can be locked in the working position. The locking is done by a pivoted part that is fixed to a base at a post. The pivoted part is equipped with an extension which is in contact with the cushion body, and prevents a backward motion of the cushion body. The pivoted part can be locked in various positions with a catch mechanism, whereby the positions of the pivoted part are associated with different positions of the head contact part.

DE 102 02 598 describes a headrest that comprises a base, as well as a parallel element that is pivotally mounted on the base. The parallel element can be displaced relative to the base and can be fixed in the selected position by blocking means. In accordance with the invention, the blocking means are formed by a coil spring, by means of which the parallel element can be retained in the selected position by a frictional connection.

U.S. Pat. No. 7,520,564 describes a headrest that has a base retained by being fixed to a post, as well as a head contact part is mounted on the base via a lever system. The head contact part comprises an elongated hole in which a pin is guided that is associated with a lower lever of the lever system. In this way, different sequences of motions are possible between the parallel element and the base.

DE 203 21 462 describes a headrest where a head contact part is mounted on a base, displaceable with upper and lower links. In the case of a crash, the head contact part can be moved forward from a rear starting position into a crash position that is blocked toward the rear by a crash blocker. Beyond that, a catch mechanism permits the adjustment of the head contact part at various comfort settings. In the respectively selected position, the head contact part can be moved into a different position by overcoming the retention force of a catch spring.

OBJECTS OF THE INVENTION

It is therefore an object of the present invention to provide an improved motor-vehicle headrest.

Another object is the provision of such an improved motor-vehicle headrest that overcomes the above-given disadvantages, in particular that makes it possible for the seat occupant to adjust the head contact part at different positions.

It is an other object to provide a headrest where the head contact part can also withstand high forces applied by the seat occupant onto the head contact surface.

Yet another object is to provide a headrest that can be easily manufactured and that is quite compact and light.

SUMMARY OF THE INVENTION

A motor-vehicle headrest has according to the invention a base fixable to a motor vehicle seat and a cushion support having a forwardly directed front face adapted to engage a head of a person in the seat. An upper link has a front end pivoted at an upper support axis on the support and a rear end pivoted at an upper base axis on the base, and a lower link having a front end pivoted at a lower support axis on the support offset downward from the upper support axis and a rear end pivoted at a lower base axis on the base offset downward from the upper base axis. The lower link forms with the base, cushion, and upper link a parallelogrammatic linkage. The cushion is shiftable relative to the base between a rear position and a front position on pivoting of the links about the respective axes. A rigid brace is pivoted on the upper link between the upper axes and on the lower link between the lower axes.

In accordance with the invention, the headrest has a base fixed to a post as well as head contact surface that is designed at a cushion support. The cushion support is mounted on the base so as to be displaceable relative to the base. The cushion support itself forms a link of the linkage.

The upper link and the lower link are pivoted on the base. The pivot formed between the upper link and the base, as well as the pivot formed between the lower link and the base are fixed relative to each other on the base. Moreover, the pivot formed between the upper link and the cushion body, as well as the pivot formed between the lower link and the cushion body, are fixed relative to each other on the cushion body. The cushion body, the upper link, the lower link and the base form a parallelogrammatic linkage. The base is fixed to a post fixed relative to a motor-vehicle seat.

The headrest can have one or more upper links, as well as one or several lower links. Both upper links are rotatable around the same upper axis, for example. Each lower link is rotatable relative to the base about the same lower axis, for example.

In accordance with the invention, the upper link is connected with the lower link by at least brace that is pivoted on the upper link as well as on the lower link between the ends thereof. For example, two upper links can be provided present that are pivoted the brace. Each brace can further form a pivot with a lower link. The base, the upper link, the lower link and the brace thus form a parallelogrammatic linkage.

In case of a load, forces can be transmitted between the upper link and the lower link by the brace. In particular, a deformation of the parts of the linkage can be prevented if, in the event a strong force is applied to the head contact surface, large leverage forces occur. For example, by the upper link, as well as by the pivot formed between the base and the upper link, as well as by a blocking mechanism locking the upper link in a certain position, forces can be transmitted to the base. From the lower link, forces can be transmitted to the base by the joint pivot. Due to the brace of the headrest in accordance with the invention, a compensation of forces from the second lever to the upper lever can take place, which prevents a deformation of the cushion support and an overload of the elements of the linkage.

The brace transmits the force exerted in the case of a load applied by the seat occupant to the cushion support from the lower link to the upper link in such a way that a counter torque to the force applied by the cushion body to the upper link is created. Hereby, the forces acting upon, for example, the latch can be reduced. In the headrest with the characteristics according to the invention, a compensation of forces is possible between the parts of the linkage, preventing an overload of the individual parts. By the second, overlaid parallelogrammatic linkage, the manufacture of the upper and lower links from plastic part is possible, for example.

Moreover, a force distribution is possible when several braces are present. If the headrest has, for example, two upper links and one lower link, a part of the force applied by the cushion body to the lower link can be applied to both upper links by several braces, thereby distributing applied forces.

The brace can, for example, be formed by a rigid strut, by means of which compressive forces as well as tensile forces can be transmitted between the upper link and the lower link.

According to one embodiment of the invention, movement of the cushion body can be prevented in the selected position by a latch. The latch can be displaced between a blocking position and a releasing position. In the blocking position, movement of the cushion body in at least one direction of the cushion body is prevented. In the releasing position, the cushion body can be displaced between the rear starting position and the front end position. Thus, even with the latch actuated, the user can pull his/her headrest forward to a comfortable position, but to move it back it is necessary to release the latch.

According to an additional embodiment, the latch is formed by a non-return device or one-way coupling. In this way it is possible, for example, to move the cushion body in a first direction of motion from the selected position, whereas movement in an opposite direction of motion is prevented by the non-return device, if the latch is in the blocking position. For example, the cushion body can be displaceable in the blocked position of the latch toward the front end position, while movement toward the rear starting position is prevented by the latch. The one-way action can be obtained by providing a latch member and the one link with interfitting sawteeth.

According to a further embodiment, the latch comprises first blocking means associated with the base and detachable in engagement with second blocking means. In the case of an engagement of the first and the second blocking means, the latch can, for example, prevent movement of the cushion body in at least one direction. The second blocking means are, for example, associated with a linkage that can be displaced relative to the base, for example, associated with the upper link. The first blocking means are, for example, mounted displaceable on the base. The first and/or the second blocking means can, for example, be displaceable between the blocked position and the releasing position. The first blocking means and the second blocking means can be brought to engage, for example, by force-locking or by positive fit.

According to a further embodiment, the first blocking means and/or the second blocking means are formed by a pawl. The pawl can, for example, be mounted on an axis that is fixed to the base. With a small movement, the first blocking means and the second blocking means can be displaced in this way when engaged or when disengaged. The design of this embodiment makes a latch that requires little space.

According to a further embodiment, the latch can be displaced by an actuation device between the blocked position and the releasing position. For example, the latch can be spring-biased into the blocking position. The actuation mechanism can move the latch out of the blocking position into the releasing position against the spring force.

According to a further design according to the invention, the actuation mechanism has a transmission device that transmits movement of an operating element associated with the cushion support to the first or the second blocking means. The transmission can occur in each position of the cushion support by the transmission mechanism.

The transmission mechanism has, for example, a pivotal lever that can be rotated by an actuation element such as, for example, a button. The actuation element is, for example, fixed to the cushion support. One lever arm of the lever can, for example, be displaced in any position of the cushion support of the linkage by contact with a blocking means mounted on the base. In this way it is possible to transmit movement of the actuation element mounted on the cushion support to the latch in any position of the cushion support.

The base is firmly connected with two post ends. The base is, for example, designed substantially flat and planar and extends, for example, in a vertical plane between the posts. In accordance with the invention, the base has at least one cutout, through which engages at least one part of the upper link and/or the lower link. Beyond that, the cutout can be traversed by other parts of the linkage. For example, at the upper link and the lower link, a brace can be retained rotatable, by which a second parallelogrammatic linkage is formed. The brace can also engage through the cutout.

With the characteristics according to the invention, the headrest can be made very compact. The cutouts in the base allow an essentially flat design of the base.

In this way it is possible to move a rear wall of the cushion support in the front end position of the cushion support close to the post ends. The cushion support can therefore be designed with small dimensions, being very narrow front to back. In particular, when the base is made of metal, for example, consists of sheet metal, it can absorb large forces. The characteristics in accordance with the invention additionally make costly molding of the base superfluous. According to one embodiment, the base is made of metal, in particular sheet metal. The base is then can absorb large forces and can be inexpensively manufactured. At identical strength, the base in this embodiment has a low weight compared with a plastic part, for example.

According to a further embodiment, the upper link and/or the lower link are designed part-circular. Along a circular path at a spacing from the axis where the axis is the radius, according to this embodiment, blocking means of a latch can be formed that make locking of the linkage in any position of the linkage possible in at least one direction of motion. Due to the spacing of the second blocking means from the axis, the latch acts upon the link with a large lever arm. The blocking means can, for example, be designed as face or sector gear on the upper and/or the lower link.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
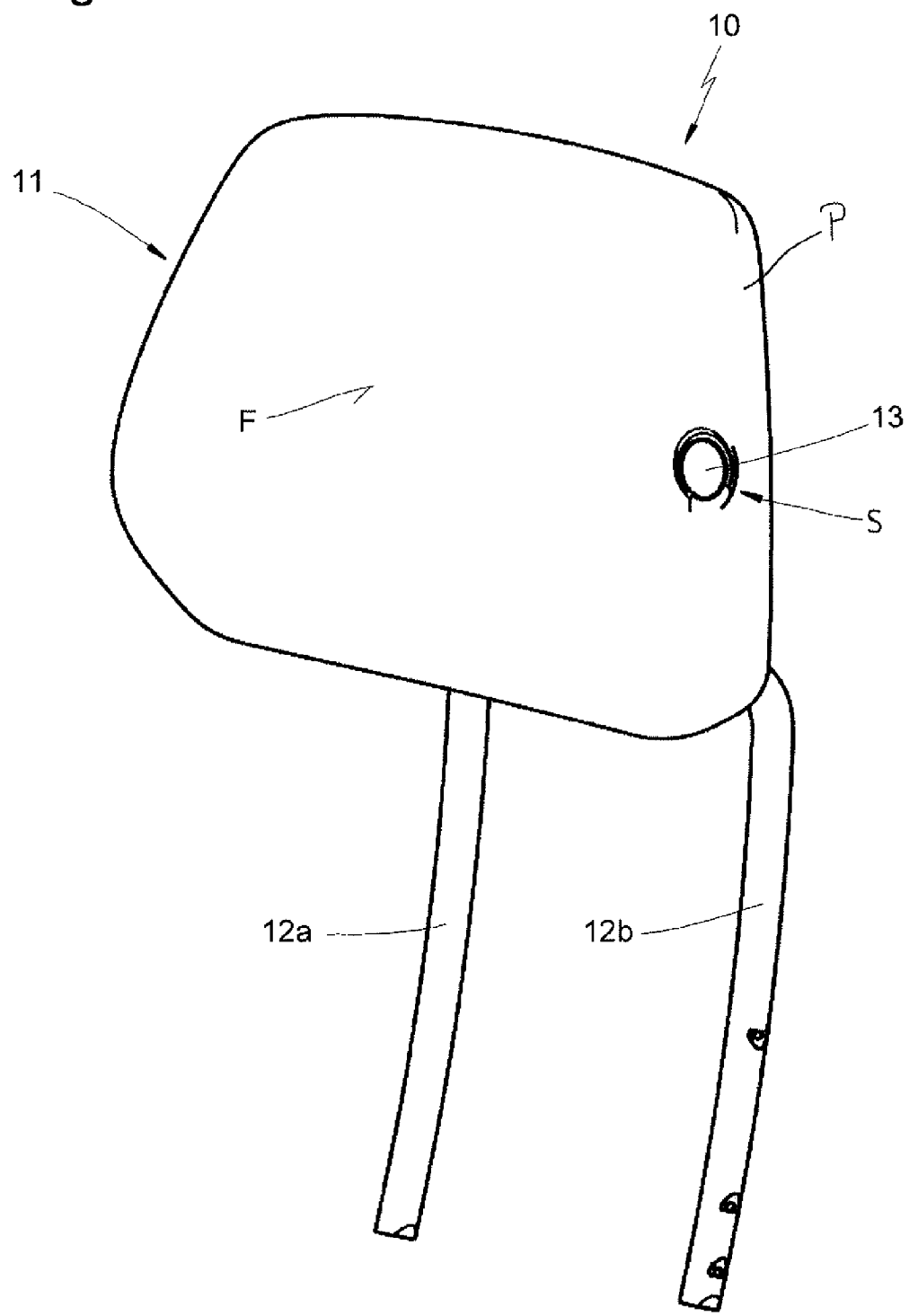
FIG. 1 is a perspective view of the headrest according to the invention.

A headrest 10 as shown in FIG. 1 comprises a cushion body 11 that is formed by a cushion P and a cushion support 37 mounted on posts 12a and 12b. The posts 12a and 12b are mounted for height adjustment in respective sockets fixed in an unillustrated seat backrest and can be locked at different heights by a locking mechanism. The posts 12a an 12b each have several notches 31 (FIG. 4) that coact with the unillustrated locking mechanism in the seat back to establish a number of predetermined height positions of the headrest 10. The locking can be released in a known manner by actuating a handle on the seat back to be able to make a height adjustment of headrest 10.

Figure 2:
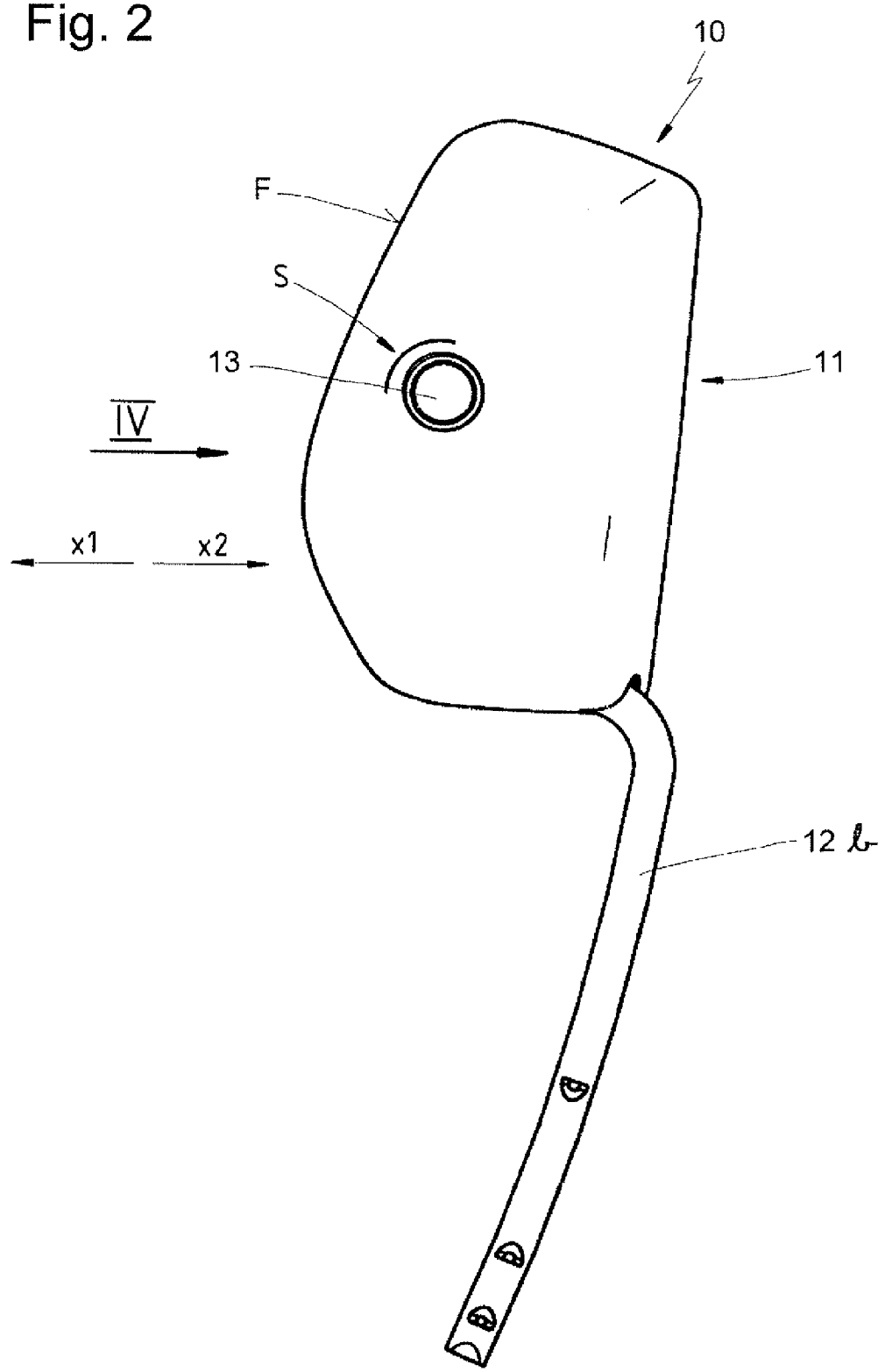
FIG. 2 is a side view of the headrest in its starting front end position.
Figure 3:
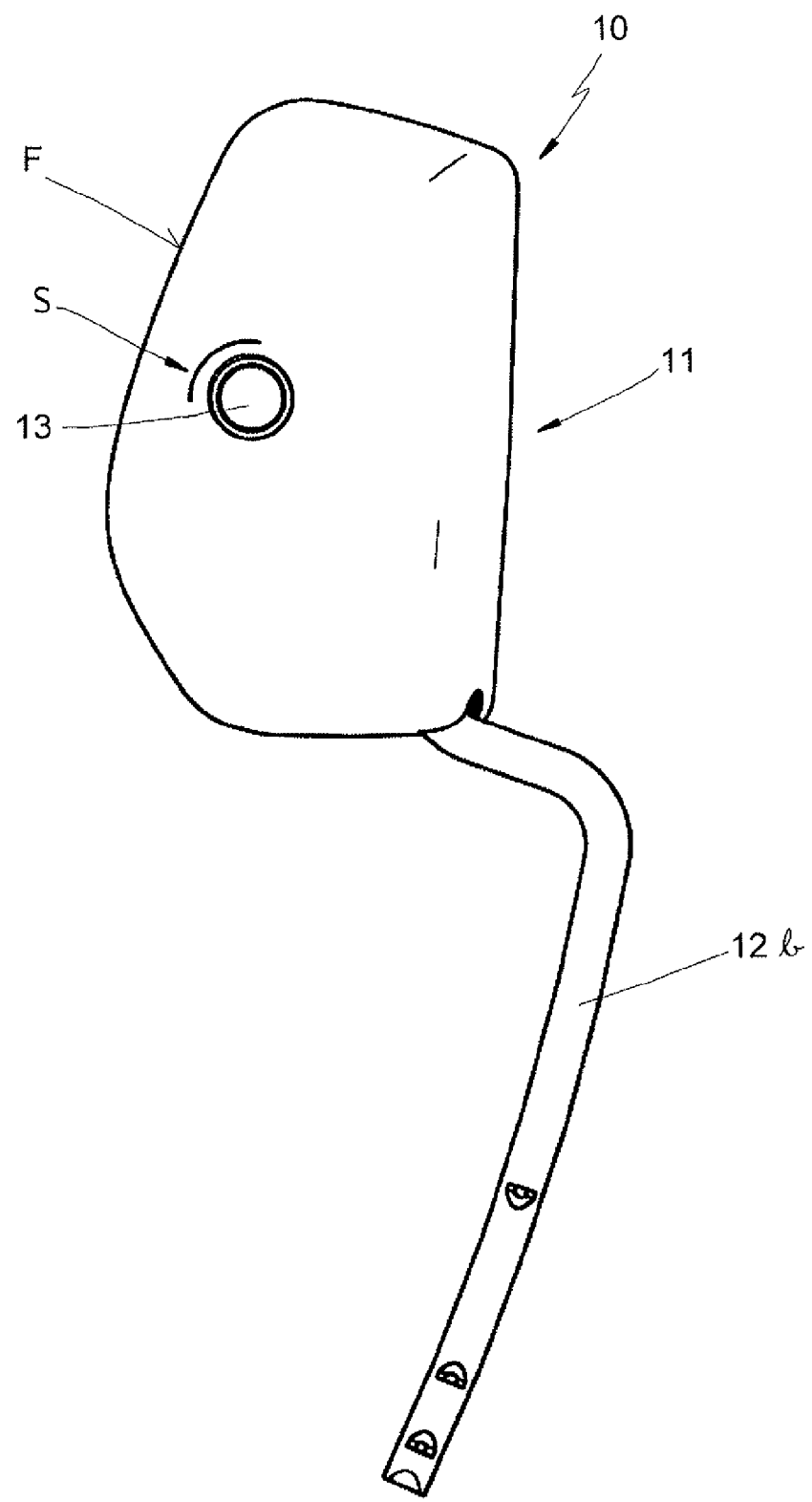
FIG. 3 is a side view of the headrest in its front end position.
Figure 4:
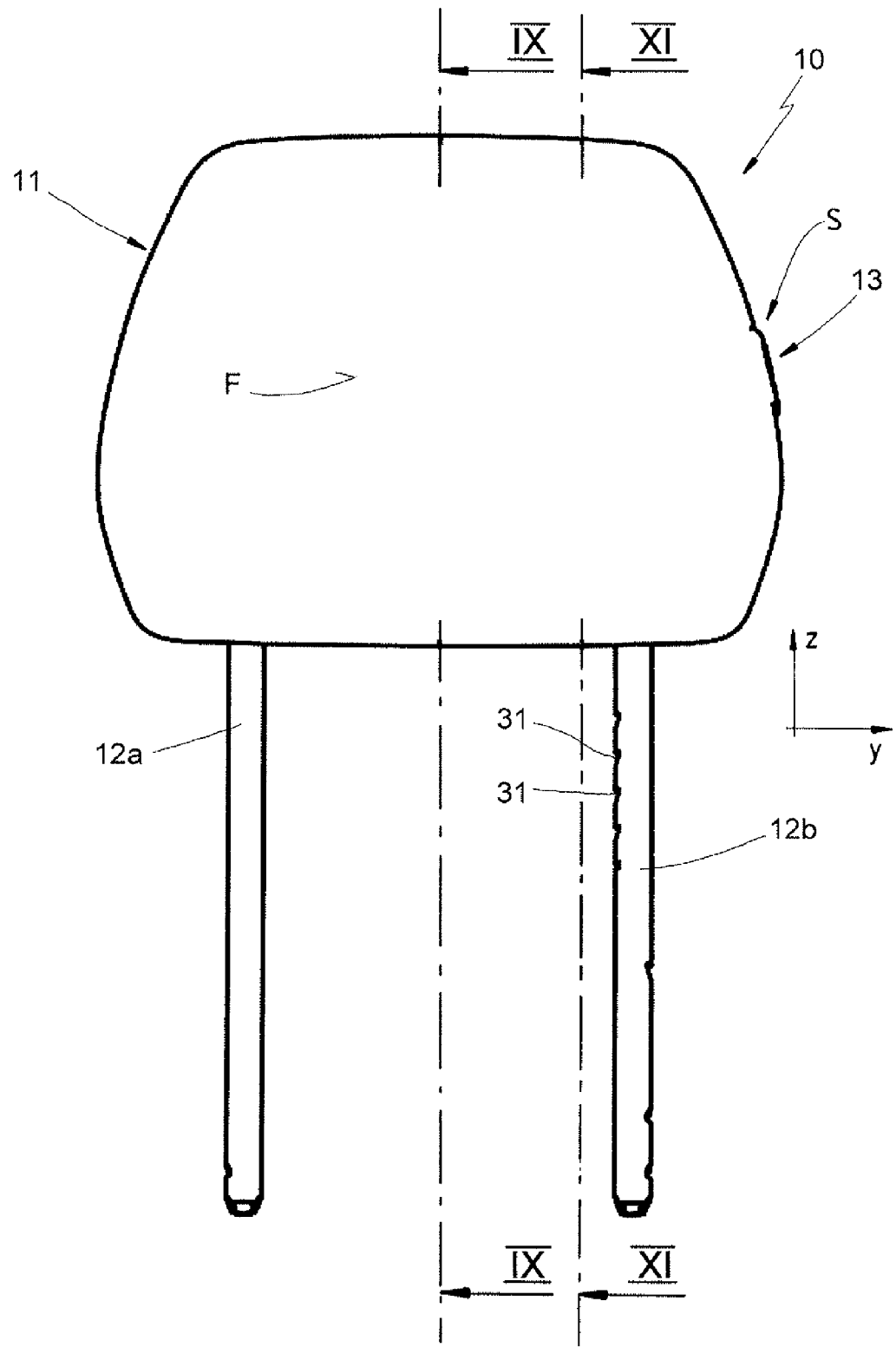
FIG. 4 is a schematic front view of the headrest in the direction of arrow IV of FIG. 2.

The cushion body 11 can be adjusted between a rear starting position shown in FIG. 2 and an front end position shown in FIG. 3. The cushion body 10 can also be set in intermediate positions between the rear and the front positions. In the front end position, a head contact surface F of the cushion body 11 is moved relative to the rear starting position closer in a horizontal direction x1 toward the vehicle occupant sitting in the seat with the headrest 10, that is forward against the normal vehicle travel direction. Moreover, the head contact surface F in the front end position is above the rear starting position in a vertical direction z (FIG. 4). The adjustability of the cushion body 11 allows adaptation of the position of the cushion body 11 to the seat position of the seat occupant and to offer in this way more comfort, as well as to also reduce the danger of injury.

A latch S prevents the cushion body 11 from unintentionally moving out of the selected position. In this embodiment, the latch S is a one-way slide coupling that can be displaced between a blocking position and a releasing position. Forward movement of the cushion body 11 toward the front end position is possible in the blocking position of the latch S. For this, a certain minimum force required for movement must be exceeded to overcome the force of an unillustrated spring that maintains the catch elements of the catch mechanism in engagement.

The cushion body 11 can only be moved back into the rear starting position in a rearward direction x2 from the selected position when a button 13 is pushed to move the latch S into the releasing position. As soon as the button 13 is released again, the latch S automatically moves into the blocking position. Movement of the cushion body 11 in the direction x2 toward the rear starting position is not possible in the blocking position of the latch S.

According to an alternative unillustrated embodiment, the latch could be designed such that in the blocking position neither movement in the forward direction x1 is possible nor movement in the rearward direction x2.

The cushion body 11 is urged by a reset force into the rear starting position by unillustrated spring-biasing means. As soon as the latch S is switched to the releasing position, the cushion body 11 is therefore moved into the rear starting position by the reset force, so long as no force countering the reset force is exerted upon the cushion body 11 that is equal to or greater than the spring reset force.

In FIGS. 5 to 8, the headrest 10 is shown without the cushion body 11. A base plate 14 is fastened at upper ends 15 of the posts 12a and 12b. The base 14 is flat and lies in an upright plane between the upper ends 15 of the posts 12a and 12b. Here the base 14 is made of sheet metal and is formed by stamping. The upper ends 15 of the posts 12a and 12b are firmly connected to the base 14 by welds 32.

Upper links 16a and 16b that carry the cushion body 11 are rotatable about an essentially horizontal upper or rear base axis a1 in angular directions v1 and v2 on an axle 33 that is fixed to the base 14. The link 16a forms together with the axle 33 a pivot G1a, and the link 16b forms together with axle 33 a coaxial pivot G1b.

Each link 16a and 16b is of part-circular shape. The links 16a and 16b are provided with respective arcuate array of gear teeth 21a and 21b at outer ends 20 facing radially away from the upper base axis a1. The arrays of gear teeth 21a and 21b that are designed like face or sector gears are parts of the latch S and serve for holding the cushion body 11 in the various positions described mentioned above and explained in further detail below.

Figure 5:
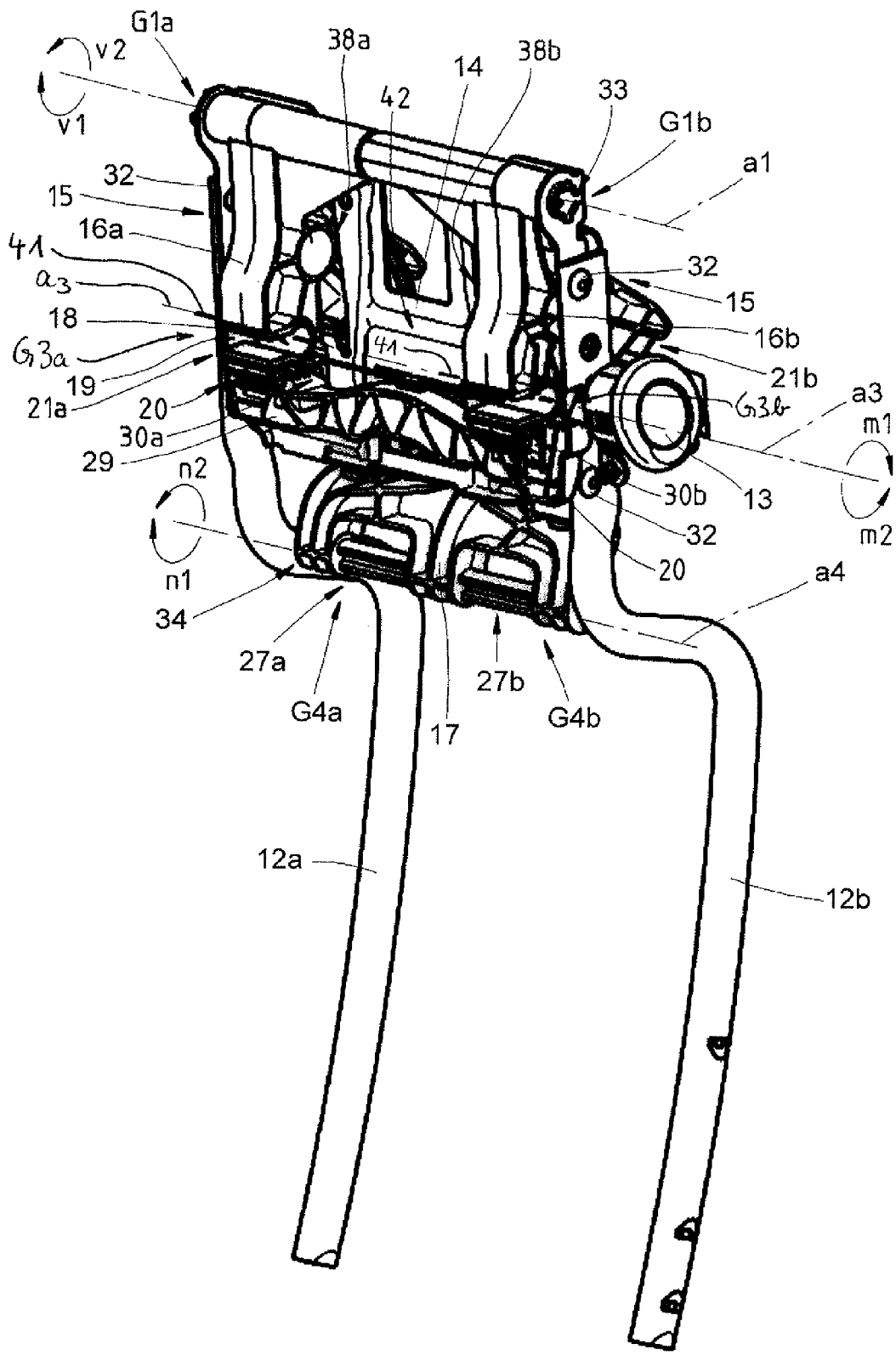
FIG. 5 is a perspective front view of the headrest in its starting position, but with the cushion removed.
Figure 6:
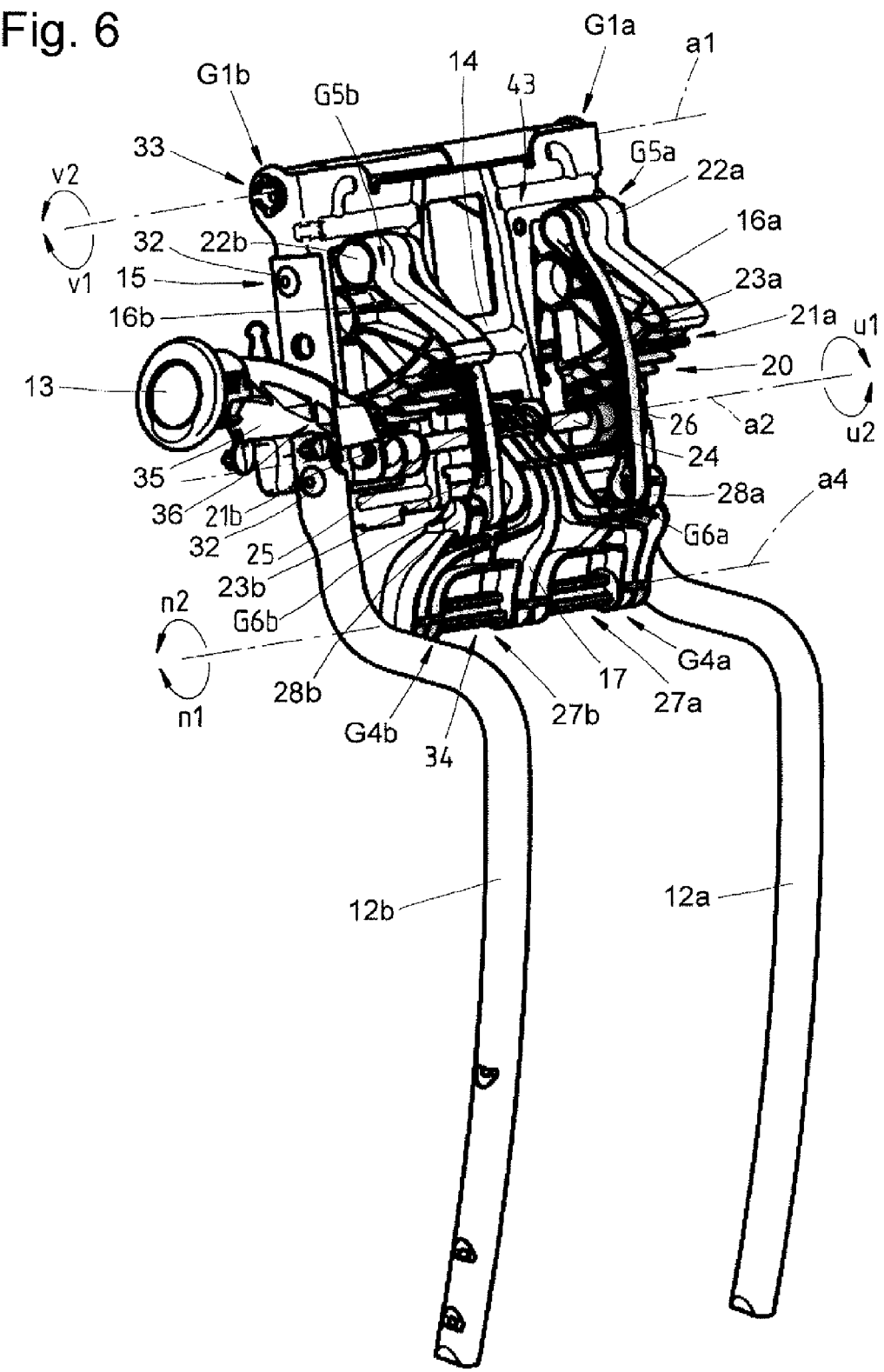
FIG. 6 is a perspective back view of the headrest in the starting position but with the cushion removed.

In FIG. 5, a front face 42 of the base 14 is shown. The base 14 is formed with cutouts 38a and 38b through which the respective links 16a and 16b extend. The cutouts 38a and 38b permit a simple design of the base 14, and thus also of the cushion body 11, which has small dimensions. Due to the cutouts 38a and 38b, the essentially flat design of the base 14 is possible to make it possible to move a back face 44 of a cushion support 37 close to the post ends 15. Thus, it is possible to design the cushion body 11 relatively small in its dimensions, parallel to the generally horizontal directions x1 and x2.

Each link 16a and 16b forms a respective bearing seat 18 (FIG. 5) of generally cylindrical shape and provided for rotatably receiving a respective end of a metal pivot pin 41 fixed in the cushion support 37 and only shown diagrammatically by a dot-dash line. The bearing seats 18 are each provided with an opening 19 for installation of the pivot pin 41 of the cushion body 11.

The links 16a and 16b pivot synchronously on movement forward of the cushion body 11 between the rear starting position and the front end position. The longitudinal axes of both bearing seats 18 of the links 16a and 16b are aligned and form a support or upper front axis a3 on which the pin 41 is centered.

Figure 8:
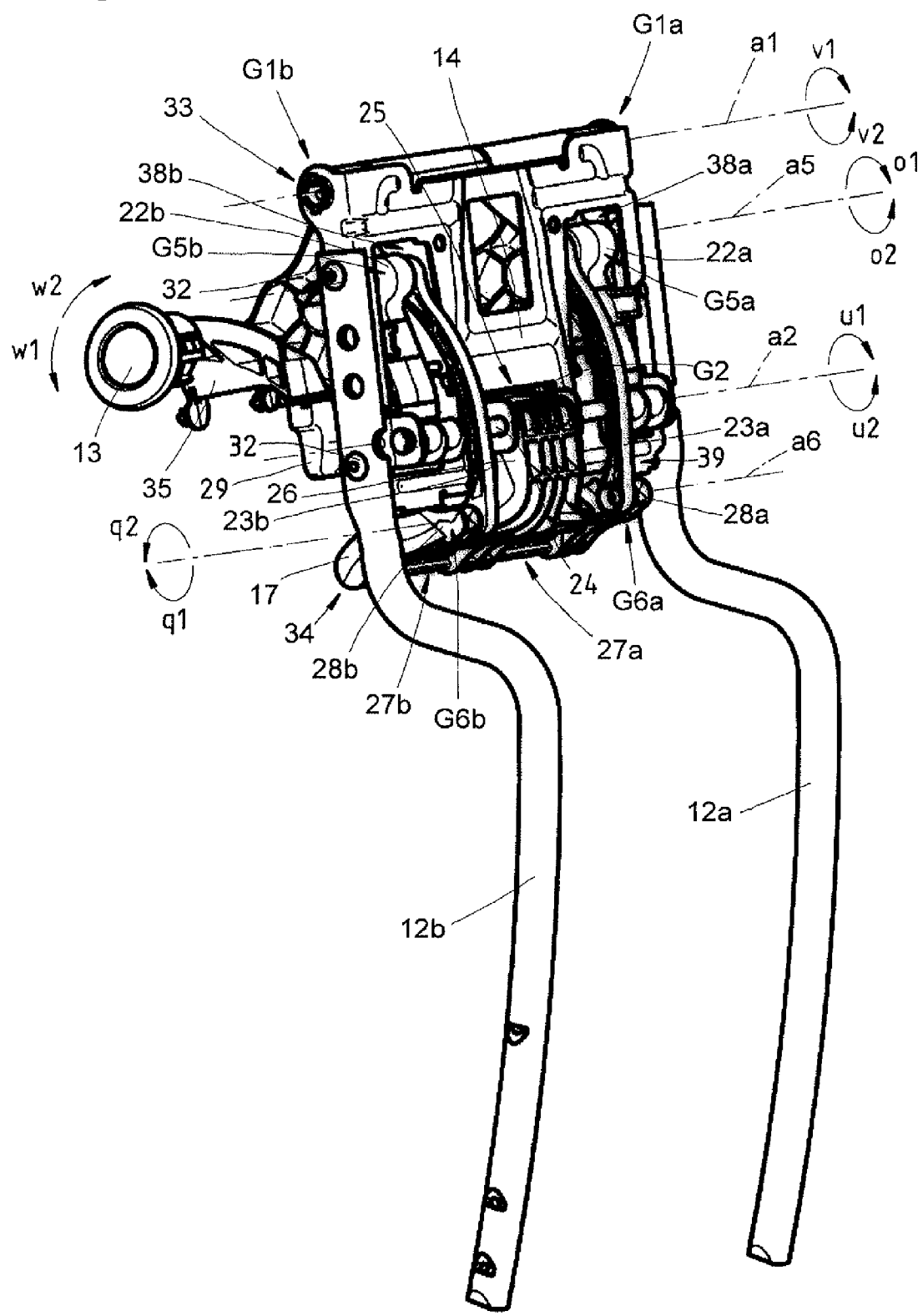
FIG. 8 is a view like FIG. 8, but in the front end position.

As shown in FIG. 8, the links 16a and 16b are formed with respective seats 22a and 22b defining an upper brace axis a5 parallel to the axis a1 and each pivotally receiving the upper end of a respective brace 23a and 23b to form a pair of coaxial pivots G5a and G5b. The braces 23a and 23b rotate relative to the links 16a and 16b in directions o1 and o2 on the pivots G5a and G5b.

FIG. 8 further shows an axle 24 mounted on the base 14 and defining a lower or rear base axis a2 parallel to the axes a1 and a5. A lower link 17 has an arm 26 formed with a seat 26 fitted around the axle 24 so the link 17 can pivot thereon in two directions u1 and u2. The link 17 and axle 24 form a pivot G2 at the base axis a2.

A lower end 34 (FIG. 7) radially spaced from the lower base axis a2 of the lower link 17 has two coaxial pivot pins 27a and 27b that define a lower front or support axis a4 parallel to the base axis a2. The pivot pins 27a and 27b are pivoted in the cushion body 11 at seats 40a and 40b indicated by dot-dash lines in FIG. 7. The cushion body 11 (not shown in FIG. 7) can pivot in this manner around the lower support axis a4 in directions n1 and n2, relative to link 17.

The lower link 17 has rearward extensions 28a and 28b on which lower ends of the braces 23a and 23b are pivoted. The extension 28a and 28b form with the respective braces 23a and 23b coaxial pivots G6a and G6b aligned on a lower brace axis a6 parallel to the other axes a1-a5 for rotation in directions q1 and q2 relative to link 17. The bearing arm 26 extends at an obtuse angle to the end 34 of the link 17, which itself extends from the axle 24 toward the rear face 43 of the base 14 and surrounds a lower end 39 of the base 14.

For latching the cushion body 11 at various positions, the above cited latch S has a pawl 29 (see FIG. 8) that can pivot about the axis a2 in directions u1 and u2 on the base 14 on the axle 24. The pawl 29 is biased by an unillustrated spring with a reset force in the direction u1 into a blocking position such that sawteeth 30a and 30b on the pawl 29 engage in the sawteeth 21a and 21b of the posts 12a and 12b. Pushing in the button 13, which is a part of an actuation mechanism of the latch S, pivots the pawl 29 from the shown blocking position in the direction u2 into the unillustrated releasing position clear of the teeth.

The pawl 29 is actuated from the button 13 by a bridge lever 35 that can pivot in directions w1 and w2 on the cushion body 11 and that is a one-armed lever. A free end 36 of the bridge lever 35 is in contact with the pawl 29 in every position of the cushion body 11. The bridge lever 35 is biased by the pawl 29, and, when the button 13 is pressed, it pivots in the direction w2 and moves the pawl 29 against its spring in the direction u2 into the releasing position. When the button 13 is released, the pawl 29 moves back in the direction u1 into the blocking position and thereby moves the bridge lever 35 in the direction w1.

In the blocking position, the gear teeth 30a engage with the teeth 21a and the gear teeth 30b engage the teeth 21b. In the releasing position of the pawl 29, the gear teeth 30a and 30b are out of engagement with the gear teeth 21a and 21b.

The gear teeth 30a and 30b of pawl 29 form, together with gear teeth 21a and 21b of the upper links 16a and 16b, a one-way coupling. In the blocking position shown in FIG. 11 of latch S, the links 16a and 16b and thus the entire linkage can be moved forward from the rear starting position in the direction v1. Rearward movement of the links 16a and 16b from the front end position shown in FIG. 12 in direction v2 is however prevented by their interfit when in the blocking position.

By actuating the button 13, the pawl 29 is moved against its spring bias out of engagement with the gear teeth 21a and 21b. Subsequently, the cushion body 11 can be moved back in the direction x2 to the rear starting position. As soon as the button 13 is released, the pawl 29 moves to engage with the upper links 16a and 16b.

Figure 7:
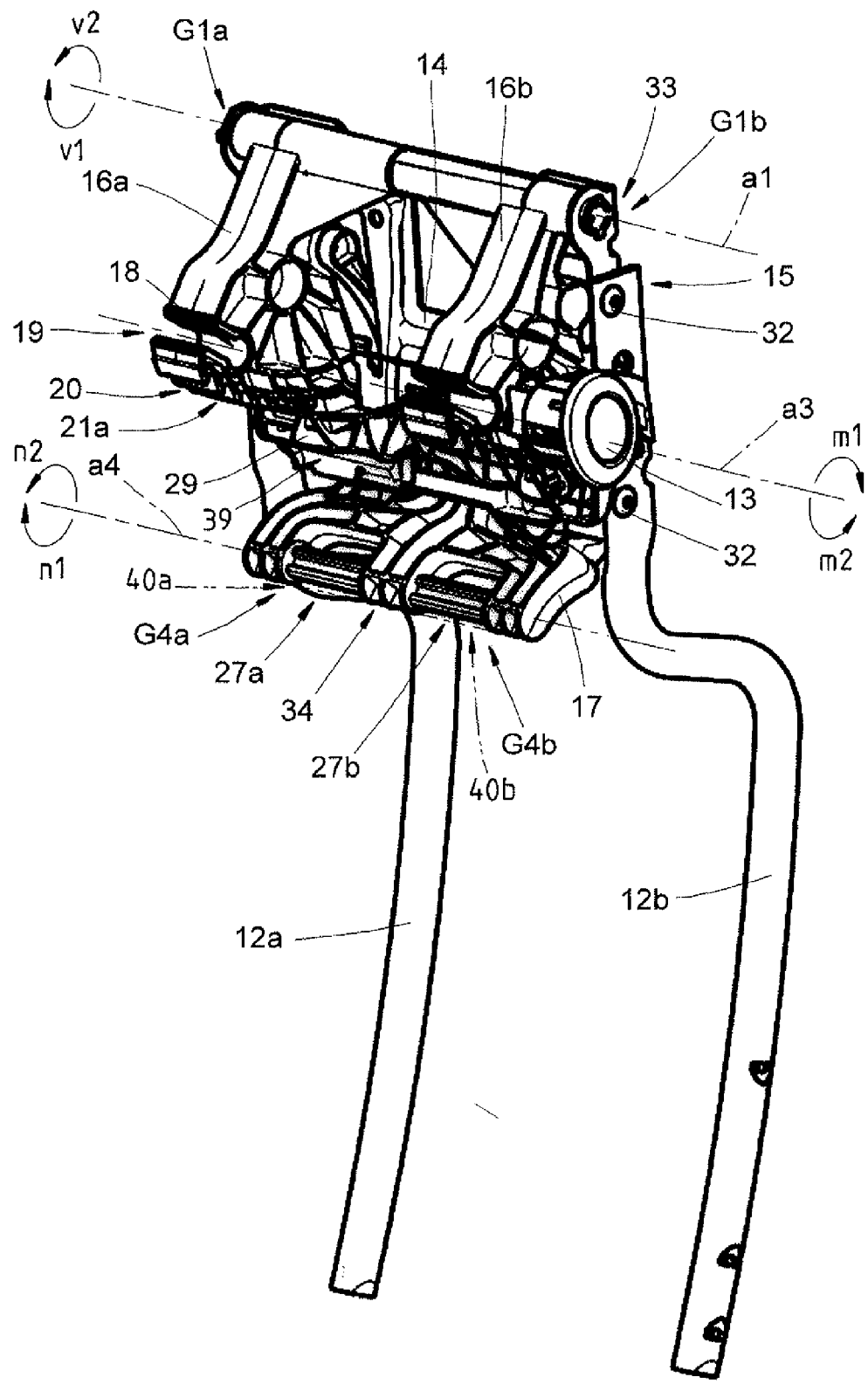
FIG. 7 is a view like FIG. 5, but in the front end position.
Figure 11:
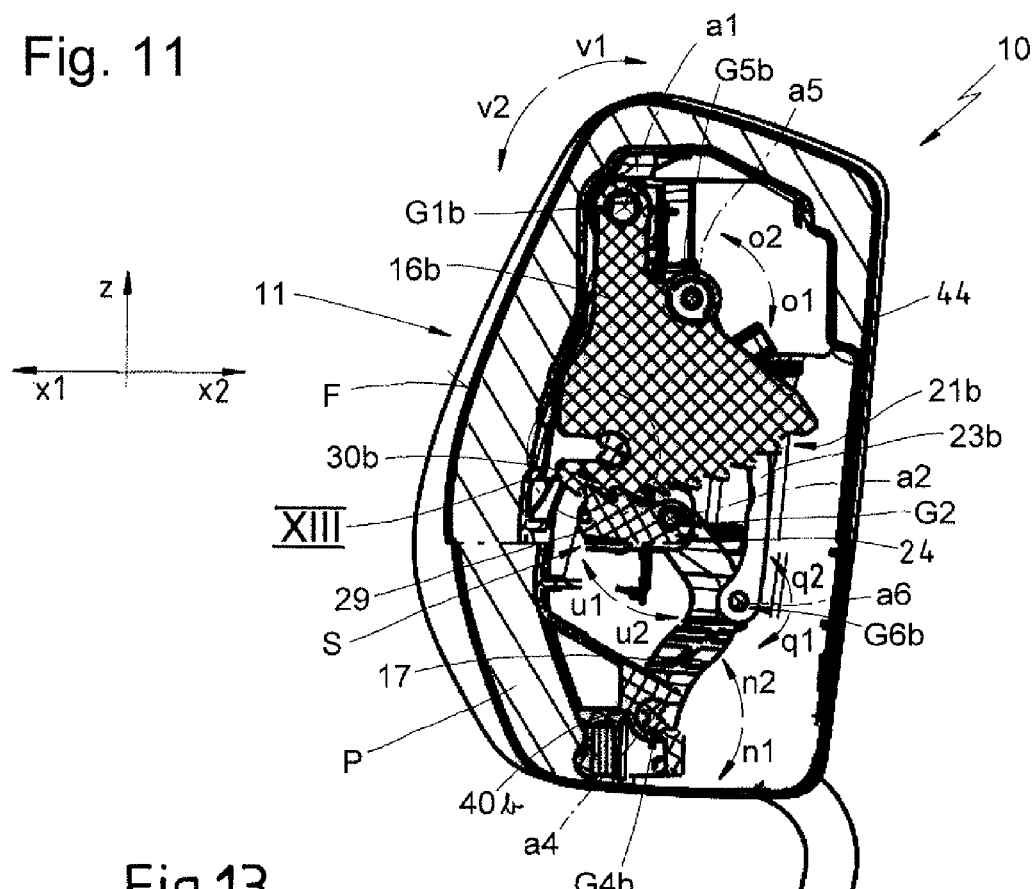
FIG. 11 is a section taken along line XI-XI of FIG. 4.
Figure 13:
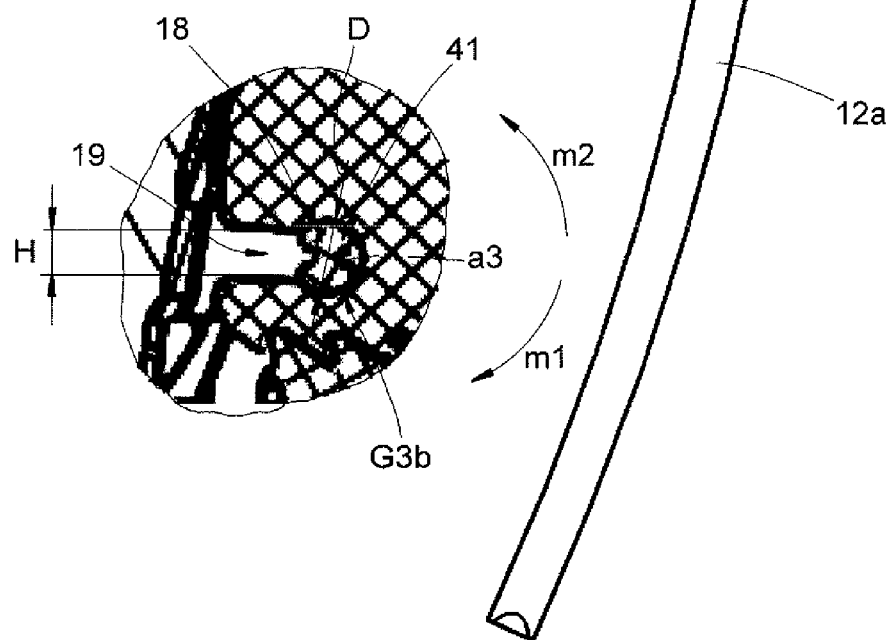
FIG. 13 is a large scale view of the detail indicated at 13 in FIG. 11.

FIGS. 11 and 13 show how, as described above, the pivot pin 41 fixed to the cushion support 37 is pivotal in the bearing seat 18 of the link 16b and also, although not shown in FIGS. 11 and 13, pivotal in the bearing seat 18 of the link 16a. The pivot pin 41 forms coaxial pivots G3a and G3b with the common upper support axis a3 together with the respective links 16a and 16b. The pivot pin 41 thus connects the links 16a and 16b together for joint rotation about the axis a1. The cushion body 11 carried on the links 16a and 16b is also rotatable in this manner relative to the links 16a and 16b around the upper support axis a3 in directions m1 and m2 (FIG. 7).

Figure 12:
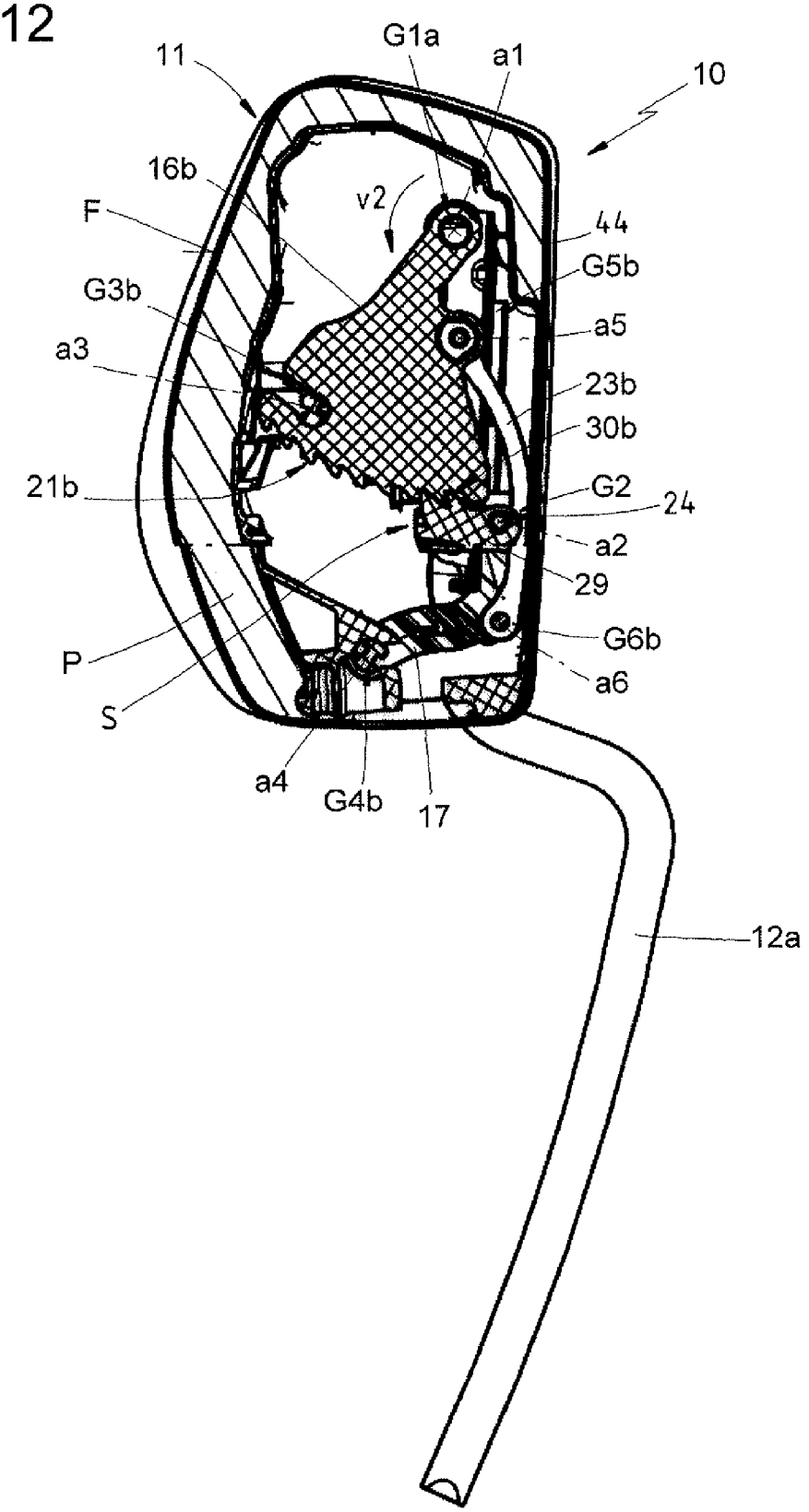
FIG. 12 is a view like FIG. 11, but in the front end position.

The pivot pins 27a and 27b of the lower link 17 (only pivot pin 27a is shown in FIGS. 11 and 12), form a bearing seat for the complementary mounting seats 40a and 40b that are formed in the cushion support 37. The pivot pin 27a and 27b and respective seats 40a and 40b form coaxial pivots G4a and G4b with a common axis a4.

According to FIG. 13, the opening 19 has height H that is smaller than the diameter D of the bearing seat 18 and the outer diameter of the pivot pin 41 that approximately to the diameter D. The pivot pin 41 is formed with flats on both sides that are parallel to each other, the outer faces of which have a spacing that approximately corresponds to or is slightly smaller than the height H. For assembly, the links 16a and 16b can be pivoted 90° relative to the position shown in FIG. 11 so that the pivot pin 41 can then be fit easily through the openings 19 into the bearing seats 18 of links 16a and 16b. In the completely assembled headrest, a latch prevents movement of the links 16a and 16b into the assembly position. The pivot pins 27a and 27b are similarly installed in the mounting seats 40a and 40b.

The axes a1, a2, a3, a4, a5, and a6 are all parallel to each other and parallel to a horizontal y axis shown in FIG. 4. The axes a1 and a2 are spaced from each other in the vertical z direction. The upper links 16a and 16b, the lower link 17, the base 14 and the cushion support 37 form the four sides of a parallelogrammatic linkage with the axes a1 and a2 fixed relative to each other on the base 14 and the axes a3 and a4 on the cushion support 37.

The links 16a and 16b are linked to the lower link 17 by the braces 23a and 23b at the axes a5 and a6. The axis a5 is between the axes a1 and a2 on the upper links 16a and 16b and the axis a6 is on the lower link 17 between the axes a2 and a4.

The link 16a, the brace 23a, the base 14 and the link 17 form a parallelogrammatic linkage. Beyond that, the link 16b, the brace 23b, the base 14 and the link 17 form another parallelogrammatic linkage. Any position of the cushion body 11 is associated with each position of rotation of links 16a and 16b, as well as link 17 relative to the base 14.

Figure 9:
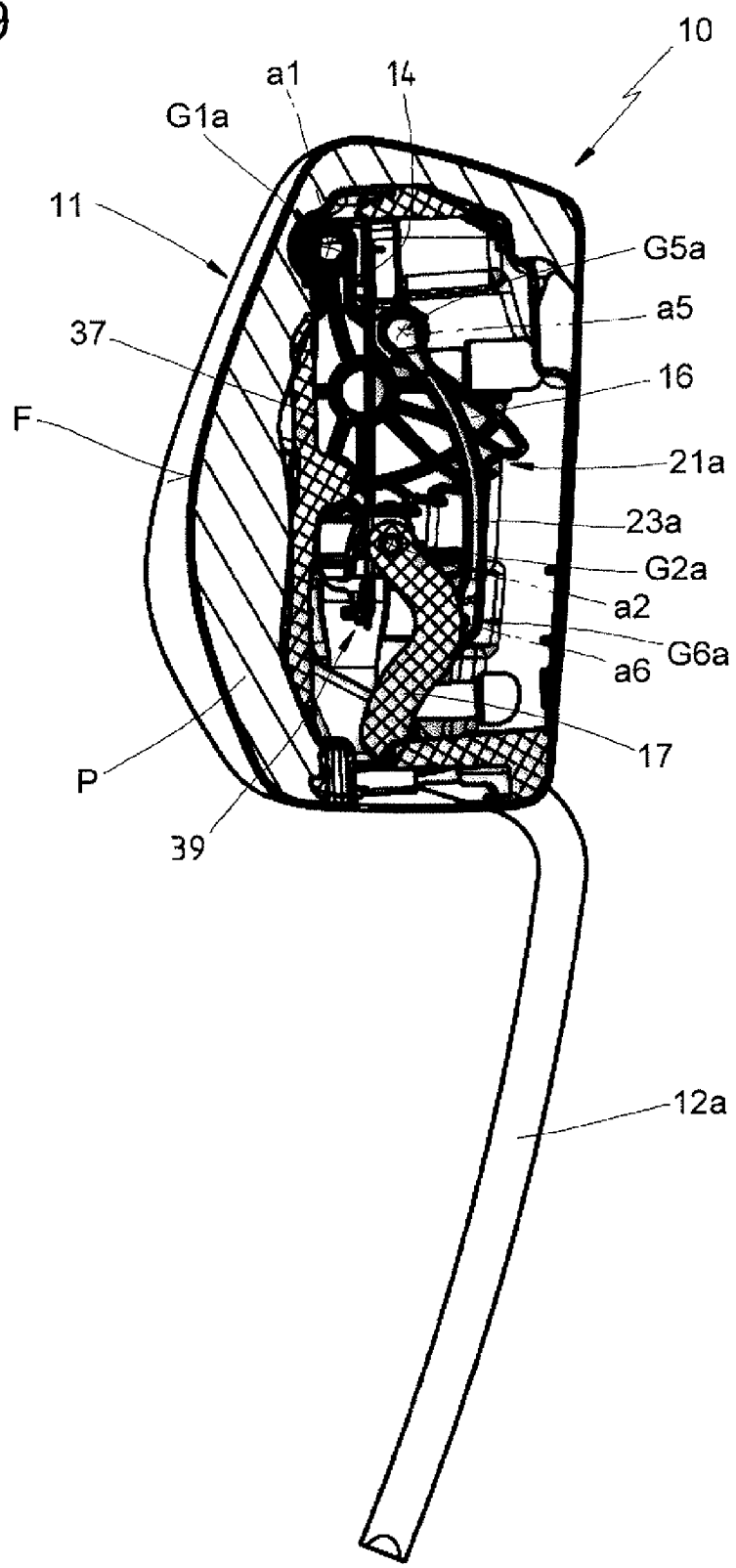
FIG. 9 is a section taken along line IX-IX of FIG. 4.
Figure 10:
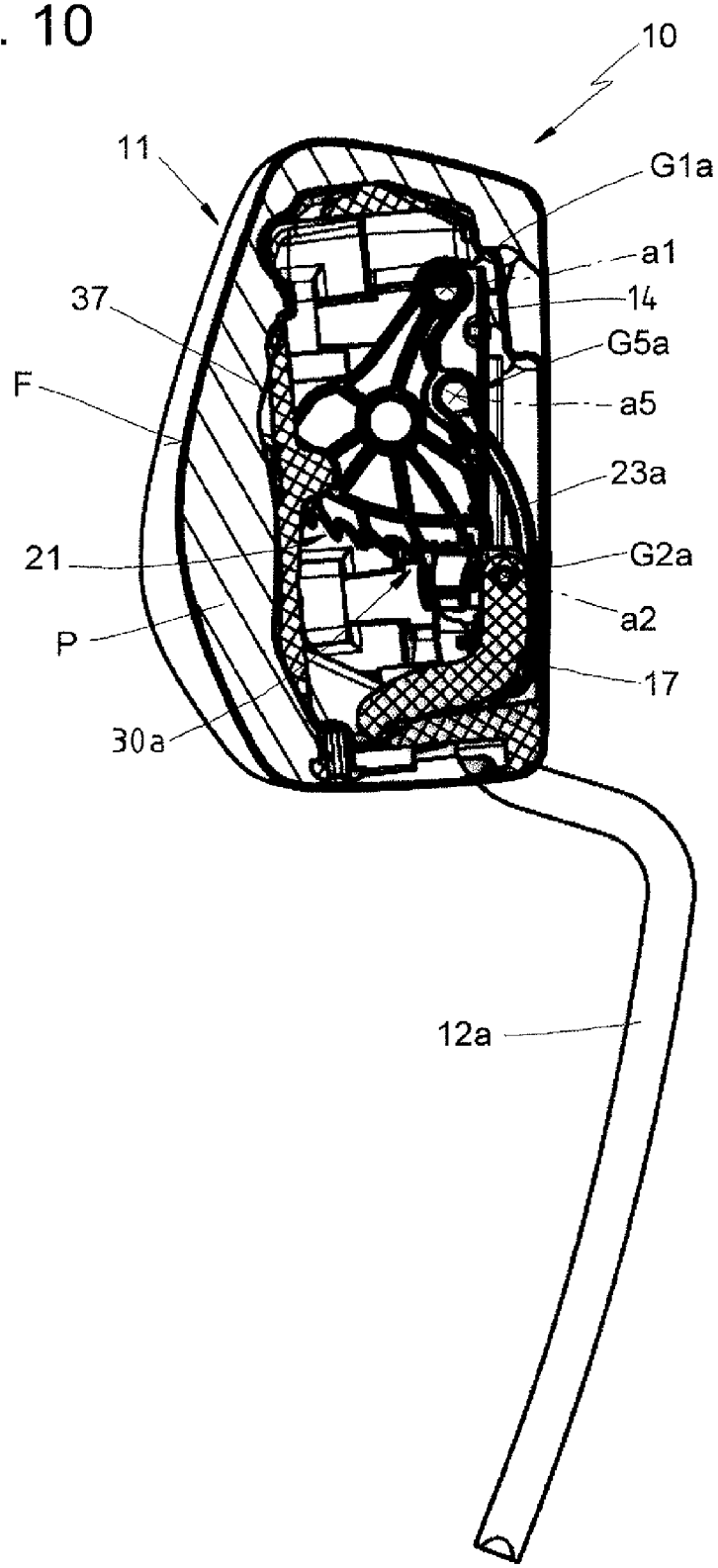
FIG. 10 is a view like FIG. 9, but in the front end position.

According to FIGS. 9 and 11, the cushion body 11, which forms part of the linkage, is located in the rear starting position. FIGS. 10 and 12 show the cushion body 11 in the front end position in which the links 16a, 16b are rotated in the direction v1 around the axis a1 and the link 17 in the direction u1 around axis a2 by a certain angle relative to the base position of the cushion body 11. By movement of the latch S into the releasing position, the cushion body 11 can be moved back from the front end position into the rear starting position or into an intermediate position, whereby in the rear starting position the links 16a, 16b are rotated in the direction v2 and the link 17 in the direction u2 with respect to the front end position of cushion body 11.

Forces that are exerted onto cushion body 11 when the head strikes the head contact surface F can be transmitted to the base 14 by the linkage. The cushion support 37 transmits forces to the links 16a and 16b as well as to link 17. While from links 16a and 16b, forces can be transmitted to the base 14 by the pivot G1 as well as also to the end 20 by the pawl 29 of the latch S, in the case of link 17, a transmission of force by a latch is not possible. The link 17 can apply a force via the pivot G2 to the base 14. By the braces 23a, 23b in accordance with the invention can transmit additional forces between the lower link 17 and the upper links 16a and 16b. Further, the braces 23a and 23b make it possible, for example, to distribute the load from the link 17 to the two links 16a and 16b.

A force acting upon the cushion support 37 causes a first torque around the upper base axis a1 in the direction v2 in the links 16a and 16b, and in the link 17 a torque around the lower base axis a2 in the direction u2. Forces acting upon the links 16a, 16b can be transmitted to the base 14 by the pivots G1a and G1b, as well as by the gear teeth 21a and 21b when the latch S is in the blocking position. A force that acts on the link 17 can, for example, be transmitted half by the brace 23a to the link 16a and half by the brace 23b to the link 16b. The force transmitted to the links 16a and 16b by link 17 by the braces 23a and 23b causes a second torque in the links 16a and 16b around the axis a1 in the direction v1 to counteract the first torque.

Because of the possibility of the transmission of forces by braces 23a and 23b, overload of the parts of the linkage as well as overload of latch S can be prevented.

We claim:
1. A motor-vehicle headrest comprising:
a base fixable to a motor vehicle seat;

a cushion support adapted to carry a cushion having a forwardly directed front face adapted to engage a head of a person in the seat;

an upper link having a front end pivoted at an upper support axis on the cushion support and a rear end pivoted at an upper base axis on the base;

a lower link having a front end pivoted at a lower support axis on the cushion support offset downward from the upper support axis and a rear end pivoted at a lower base axis on the base offset downward from the upper base axis, the lower link forming with the base, cushion support, and upper link a parallelogrammatic linkage, the cushion support being shiftable relative to the base between a rear position and a front position on pivoting of the links about the respective axes; and an upright plate on the base, extending vertically generally between the upper base axis and the lower base axis, and formed with a cutout through which the upper link can pivot.

2. The motor-vehicle headrest defined in claim 1, further comprising:

a latch mechanism including a first latch member on one of the links and a second blocking element on the base formed with interengageable sawteeth for releasably holding the cushion support against movement relative to the base in at least one direction between the front position and the rear position such that on interengagement of the sawteeth the latch mechanism impedes movement of the cushion support only into the rear position.

3. The motor-vehicle headrest defined in claim 2 wherein the latch member is shiftable relative to the base between a blocking position engaging the one link and impeding rearward movement of the cushion support and a releasing position disengaged from the one link and not impeding rearward movement of the cushion support.

4. The motor-vehicle headrest defined in claim 3 wherein the one link is the upper link.

5. The motor-vehicle headrest defined in claim 4 wherein the latch member is a pawl pivotal on the lower base axis, the latch member and upper link being formed with interengaging sawteeth that, when engaged, block movement of the front link in a direction moving rearward.

6. The motor-vehicle headrest defined in claim 3, further comprising actuating means for shifting the latch member between the blocking position and the releasing position.

7. The motor-vehicle headrest defined in claim 6 wherein the actuating means includes an element coupled to the latch member for shifting the latch member between the blocking position and the releasing position.

8. The motor-vehicle headrest defined in claim 1 wherein the plate is of sheet metal.

9. The motor-vehicle headrest defined in claim 1 wherein there are two such upper links and the base is formed with a pair of axially spaced such cutouts through which the respective upper links can pivot.

10. The motor-vehicle headrest defined in claim 1 wherein the upper and lower links are made of plastic.

* * * * *